Sept. 19, 1950  E. F. MIDDLETON  2,522,956
PROCESS OF AND APPARATUS FOR SHAPING PLASTICS
Filed May 18, 1944  5 Sheets-Sheet 2

INVENTOR.
EARL F. MIDDLETON
BY
George S. Hastings
ATTORNEY

Sept. 19, 1950      E. F. MIDDLETON      2,522,956
PROCESS OF AND APPARATUS FOR SHAPING PLASTICS
Filed May 18, 1944      5 Sheets-Sheet 3

INVENTOR.
EARL F. MIDDLETON
BY
Georges Hastings
ATTORNEY

Sept. 19, 1950     E. F. MIDDLETON     2,522,956
PROCESS OF AND APPARATUS FOR SHAPING PLASTICS
Filed May 18, 1944                         5 Sheets-Sheet 4

INVENTOR.
EARL F. MIDDLETON
BY
George Hastings
ATTORNEY

Patented Sept. 19, 1950

2,522,956

UNITED STATES PATENT OFFICE 2,522,956

PROCESS OF AND APPARATUS FOR SHAPING PLASTICS

Earl F. Middleton, Scarsdale, N. Y., assignor to Design Center, Incorporated, a corporation of New York Application May 18, 1944, Serial No. 536,208

17 Claims. (Cl. 18—19)

This invention relates to fabrication of plastic sheets and more particularly to improvements in methods relating to and apparatus for forming or shaping sheet material, such as thermoplastic sheet material or webs in any desired shape or size.

Although attempts have been made from time to time to provide for rapidly forming shaped articles from thermoplastic sheets, it has been found difficult to rapidly and successfully draw articles from sheets or webs of thermoplastic material. This is probably due to lack of understanding of the characteristics of these materials and proper manner of handling such material during the operation of the various devices necessary for holding, heating, separating and drawing blanks from endless webs of thermoplastic material.

I have found that satisfactory results can be obtained by so manipulating such web material that at all times it is under positive control during the several steps necessary to achieve automatic and successful drawing or forming operations.

According to a preferred form of the present invention, means are provided for gripping both the upper and lower faces of the longitudinal edges of a thermoplastic web progressively in order to feed predetermined lengths of web in succession from a source of supply of web material, such as a roll of cellulose, acetate, ethylcellulose film or any other like thermoplastic material including such materials as esters or ethers of cellulose alone or mixed or compounded with other suitable materials including, plasticizers, resins, fillers, or such materials laminated with or without other sheet materials, metal foil, etc.

The web is so fed that at all times its longitudinal edges are positively gripped and supported from the time the web material leaves the reel supply or a point closely adjacent the reel of material, or source of supply until it is fed to and past the several mechanisms constituting the drawing elements of the press.

As the result of the action of the web feeding means which can be run intermittently or continuously, predetermined lengths of web are disposed in a heating zone where each length as fed is subjected to either constant or differential heating depending upon the type of article to be formed. As the result of the heating operation for a time sufficient to soften or energize the thermoplastic material to satisfactory drawing or shaping condition, the characteristic tendency of the heating material to sag is overcome by the continued operation of the feeding means.

This is because the edges of the web are firmly held from a point adjacent the source of supply through the machine and to the discharge side of the press. This arrangement positively controls the position of the web at all times for delivery by the feeding means to and through the press. This means that at all times the web is progressively fed from the source of supply to and through the heating zone, and positioned properly relative to the mechanism which separates heated blanks from the web for shaping, and for continuing the feed of waste portions of the web through the press for discharge therefrom. From this it follows that the web is properly fed at all times and danger of stretching, distortion, breakage or other unsatisfactory handling of the web and especially the heated portion thereof is substantially eliminated.

It has also been found that by employing endless traveling feeding means which engage the longitudinal edges of a web, it is possible to achieve great economy in the formation of shaped articles due to the fact that substantially the entire width of each predetermined length of web advanced can be heated and made available for removal of heated blanks therefrom for shaping or drawing. In other words, a narrower web can be used to greater advantage with a minimum of waste.

In order to insure that proper drawing can be effected, the press is preferably provided with an upper die ring suitably mounted therein in such a manner that a constant and predetermined clearance is provided between the bottom face of the upper die ring and the top face of the lower die ring. This arrangement results in very satisfactory drawing with little or no wrinkling of the blank edges as the result of drawing operations.

It has been found that in drawing different shapes, various parts of the sheet should be heated to different temperatures in order to make these portions of the sheet more plastic and shapeable than others. This desired object cannot be accomplished by the use of the usual or conventional heating device or plates and for that purpose we have developed heating mechanisms for differentially heating each fed portion of web or sheet so that portions are subjected to a pattern of heat conforming to the requirements of a particular shape to be drawn. Each part of each pattern, if desired, can be controlled individually as by a rheostat or in any suitable manner.

The press is automatic and its operations are so controlled and interlocked that all parts thereof including the web feeding mechanism operate in synchronism. Individual portions of the cycle can be increased or decreased in accordance with the requirements of a particular shape to be drawn. Some forms require a more rapid drawing operation than others, in which case a long dwell at the end of each drawing structure of the male die may be provided. In other shapes a very slow draw may be needed with a comparatively short dwell in the movement of the male die depending on the thickness of the material, the shape, etc.

It is an object of my invention, therefore, to provide an improved method of and apparatus for automatically or rapidly drawing articles from heat energized thermoplastic sheet materials.

It is a further object of my invention to provide improved feeding mechanism operating in conjunction with a drawing press capable of shallow or deep drawing according to the desires of a manufacturer, and so treat the web of material being fed that at all times uncontrolled sagging of heated portions thereof is prevented and proper drawing effected regardless of the final size and shape of the article being formed.

It is a further object of my invention to provide an improved method of and apparatus for forming articles from thermoplastic material in sheet or web form, and feeding the material either intermittently or continuously through a heating zone where predetermined sections of the web being fed are heated differentially in order that controlled drawing may be effected in the best possible manner.

It is an additional object of my invention to provide an improved method of and apparatus for intermittently advancing a web of thermoplastic material in order to position predetermined lengths thereof in a controlled heating zone so that selected sections of each length of web advanced may be exposed to varying intensities of heat to effect a controlled pattern of heating conforming to characteristics of the die and to insure that each heat energized portion of the web may be held firmly in order to prevent sagging during and after the heating operation and the transit of the heat energized web material into the range of operation of the press blanking and drawing elements.

The invention further contemplates the provision of web feeding mechanism for feeding successive predetermined lengths of a continuous web of heat energizable thermoplastic material to and past a heating zone where each portion is exposed to heat of constant or differentially heating intensity after which each heat treated portion of the web is moved by the same feeding means into the range of operation of the press mechanism and the waste is carried through the press for discharge therefrom by the same feeding means.

The invention further consists in the provision of web feeding mechanism for feeding predetermined lengths of web into the range of action of heating mechanism such that substantially the entire width of each length of material is subjected to heat of either constant or varying intensity depending upon the characteristics of the particular shape to be formed thereby resulting in substantial savings in material and a more satisfactory preparation of the material for drawing.

The invention also contemplates the provision of improved mechanism in the form of upper and lower drawing rings which are so constructed that in the operation of the male die the formation of wrinkles in the edges of each blank drawn is substantially eliminated.

With these and other objects not specifically mentioned in view, the invention consists in certain features which will be hereinafter fully described, and then set forth in the claims hereunto appended.

In the accompanying drawings which form a part of this specification, and in which like characters of reference indicate the same or like parts:

Figure 1:
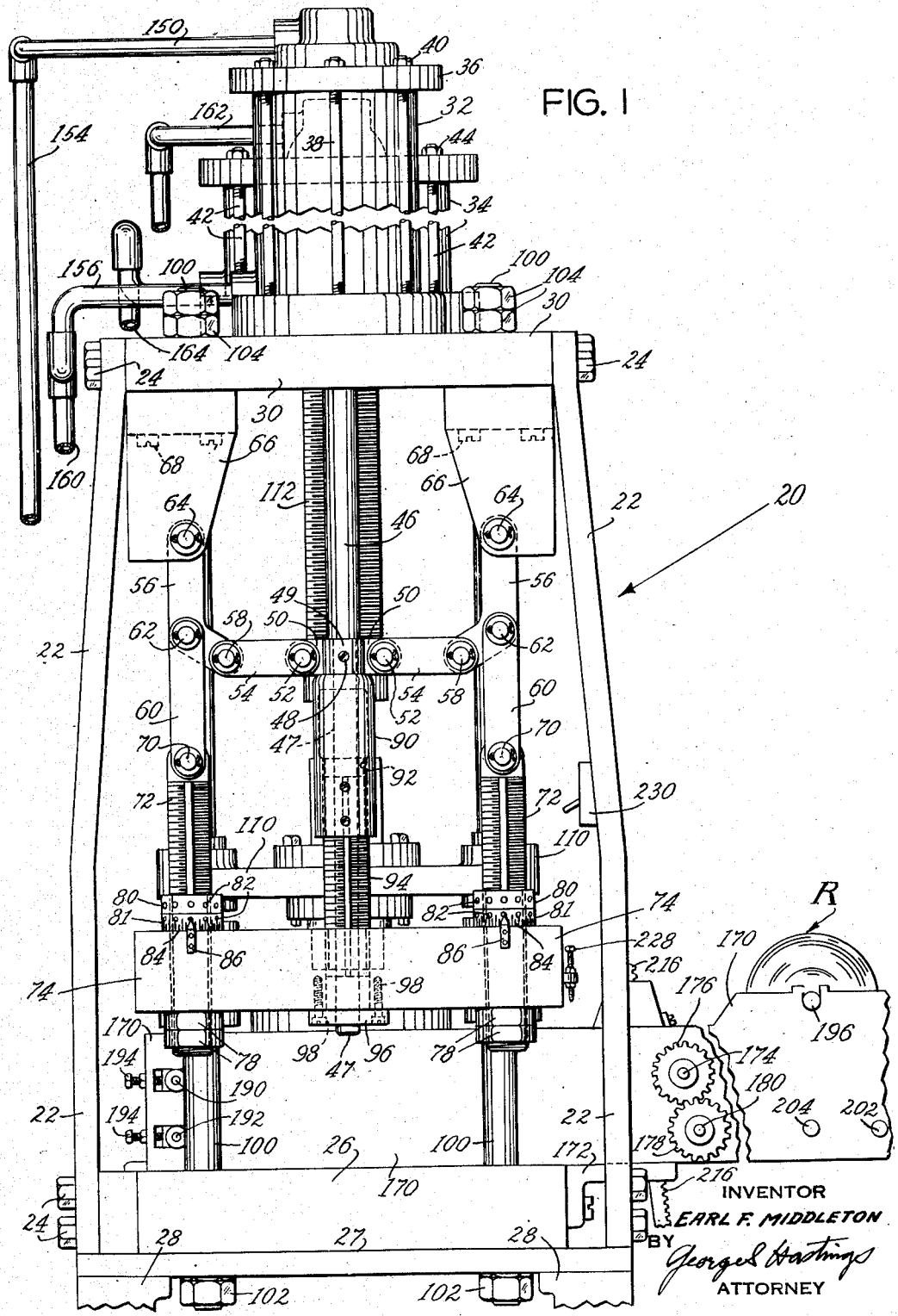
Figure 1 is a side elevation of the drawing press.
Figure 2:
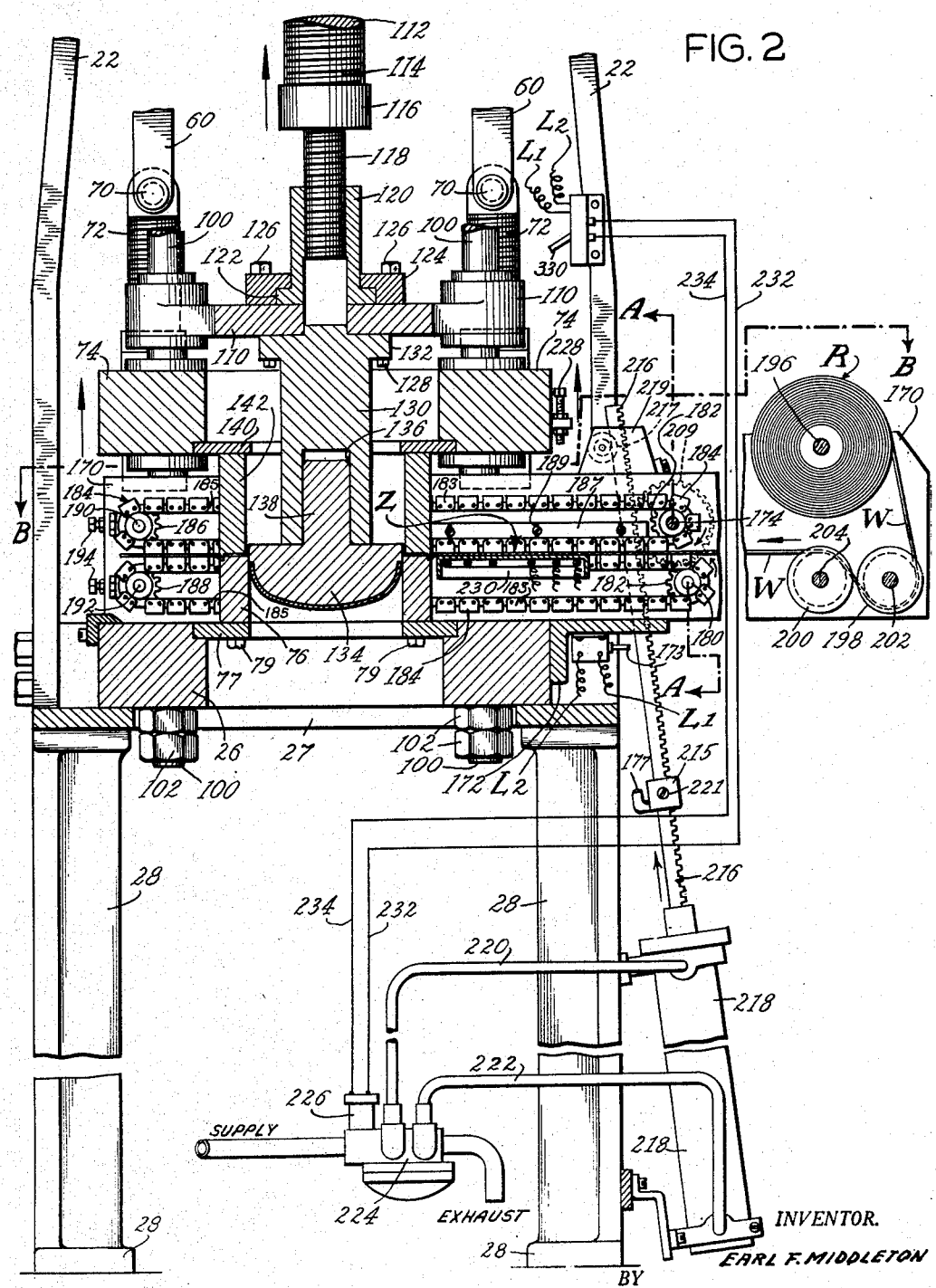
Figure 2 is a side elevation of the press partly in section showing the construction of the web feeding mechanism and its relation to the heating and shaping mechanisms of the press.
Figure 3:
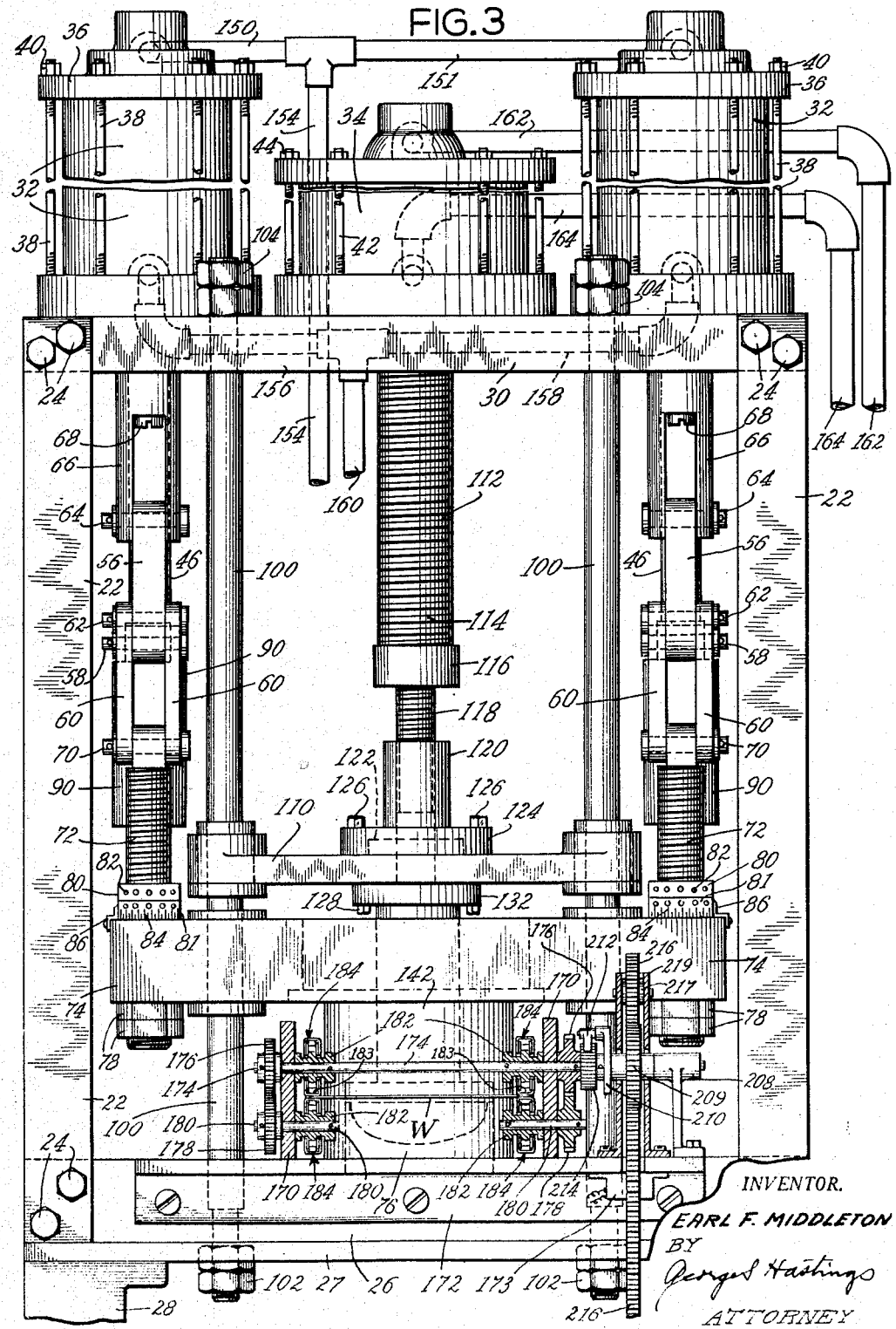
Figure 3 is a front elevation taken on line A—A of Figure 2.

Referring to Figures 1, 2, 3 and 4 which show a preferred form of the invention, there is provided a fluid operated press designated generally 20. The press is provided with uprights 22 secured by screws 24 to a bed plate 26 supported on a table 27 mounted on legs 28 which may be fastened to the floor in any known manner. Fixed to the upper ends of uprights 22 is a plate 30 upon which are mounted cylinders 32 and 34 employed in operating the upper drawing ring and male die or punch, respectively. While any type of press operating mechanism may be employed for moving the male die and upper drawing ring to and from operative position, we prefer to utilize pneumatic means as employed in cylinders 32 and 34 and their associated elements. As shown in Figure 3, cylinders 32 are held in operative position upon plate 30 by means of threaded rods 38 provided with suitable nuts 40 bearing against plates 36. In a similar manner, cylinder 34 is fixed to plate 30 by means of rods 42 and nuts 44.

Reciprocating in cylinders 32 are pistons 33 of conventional design provided with piston rods 46 extending downwardly from cylinders 32 through plate 30 as shown in Figures 1 and 3. Each piston rod 46 is connected by means of a set screw 48 to a cross head ring 49 having lugs 50 extending therefrom. Pivotally connected at 52 to lugs 50 are rings 54 of a toggle mechanism which includes levers 56 and 60.

Levers 56 are connected at 58 to links 54 (see Figure 1). Levers 56 and 60 are pivotally connected at 62. One arm of each lever 56 is pivotally mounted at 64 in brackets 66 suitably attached by screws 68 to the underside of plate 30. As shown in Figure 3, two sets of toggle members are employed, one set being operated by each of the rods 46.

The lower ends of each of the levers 60 (Figures 1 and 3) are pivotally connected at 70 to threaded adjusting studs 72 which carry the upper drawing plate 74 which coacts with the lower drawing ring 76, described hereinafter. As indicated in Figures 1 and 3, the position of upper drawing plate 74 on studs 72 can be adjusted with a considerable degree of refinement by means of nuts 78 and 80, 81. Nuts 78 are located on studs 72 beneath plate 74, and nuts 80, 81 are positioned on studs 72 above plate 74. The nuts 80 and 81 are provided with holes 82 in order to allow fine adjustments to be made when these nuts are turned individually on stud 72. Nuts 81 may be provided with graduations 84 so that when nuts 81 are turned relative to pointers 86 suitably secured to plate 74, the amount of movement of a nut can be determined with close accuracy and in this manner the amount of movement of the plate up or down can be readily determined, and the plate set in accordance with the demands of any particular drawing operation. It will be seen, therefore, that by turning nuts 78, 80 and 81 on stud 72, any desired adjustment of the drawing ring can be effected.

As shown in Figures 1 and 3, in order to control the down limits of movement and insure that upper drawing ring 142 on plate 74, will at all times be positioned properly with respect to lower drawing ring 76, there are provided two stop sleeves 90 with the tops of which rings 49 may engage as the rods 46 move downwardly. Stop sleeves 90 are provided with internal threads 92 engaging exteriorly threaded sleeve 94 extending upwardly through plate 74 and provided with a flange 96 which by means of screws 98 is fastened to the underside of plate 74 (Figure 1). Rods 46 are provided with reduced portions 47 which slide in bores in sleeves 90 and 94 in order to properly guide the rods 46 at all times. The adjustment just described makes it possible to accurately control the limits of movement of the toggle mechanism such that pivotal connections 62, 64 and 70 thereof may always lie in a straight line when the upper drawing ring 142 is located in operative position relative to lower drawing ring 76. This provides a constant and predetermined clearance between the upper ring 142 and lower drawing ring 76 and insures against movement of the upper drawing ring relative to the lower ring regardless of any pressure which may be developed by the material being drawn. This arrangement, therefore, tends to insure against the formation of wrinkles in the material being drawn because of the fact that only a predetermined clearance has been provided and neither of the coacting rings can move apart and allow wrinkles to begin or form.

Figure 4:
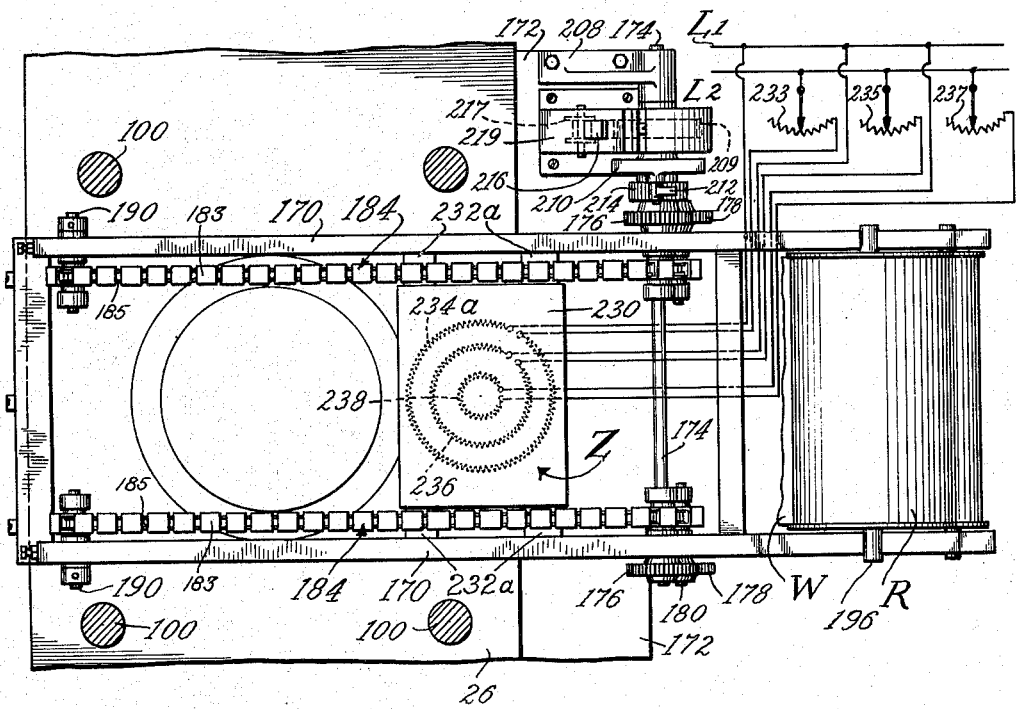
Figure 4 is a plan view taken on line B—B of Figure 2 omitting the drawing rings.

Referring to Figures 1, 3 and 4, rods 100 extend downwardly through plate 30, plate 74 and bed plate 26, and are secured in assembled relationship in the machine by means of nuts 102, 104. One of the functions of rods 100 is to provide guides for plate 74 and cross head 110 which forms a part of the male die or punch mechanism, and thereby insure accurate registration of the male die relative to the drawing rings.

A rod 112 which is connected to a piston 35 mounted for reciprocation in cylinder 34 is provided with a threaded portion 114 on which is screwed a head portion 116 of a threaded rod 118, which rod is threaded into a member 120 having a flange 122 secured by means of a flanged collar 124 and nuts 126 to cross head 110. Fixed to the underside of cross head 110 by means of screws 128 is a male die or punch supporting member 130 having a flange 132 through which screws 128 pass. The free end of member 130 detachably supports the male die 134. This die may be detachably mounted on member 130 in any suitable manner. In the form selected for illustrative purposes, member 130 is provided with a bore 136 in which a portion 138 of die 134 is detachably held.

Referring to Figure 2, plate 74 is provided with an annular ring 140 on which is suitably carried a drawing ring 142 which coacts with the lower drawing ring 76. Rings 140 and 142 may be removed and other rings substituted therefor and in like manner lower drawing ring 76 which is detachably secured to a support plate 77 mounted on bed plate 26 by screws 79, may be removed and another ring substituted therefor in accordance with the type of male die or punch 134 used, and the particular drawing job to be performed. It is to be noted, however, that when the piston rods 46 have moved rings 49 to their lowermost limits, the adjustment of studs 72 relative to plate 74 and its associated rings 140, 142, is such that a predetermined clearance between rings 142 and 76 is always maintained, as described hereinabove.

Figure 5:
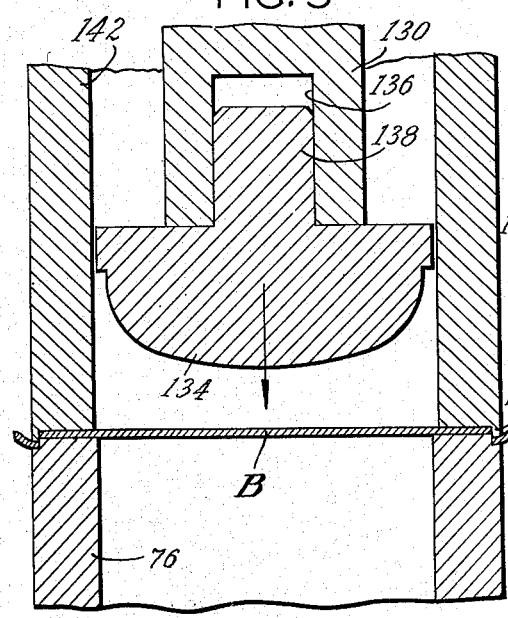
Figure 5 is a sectional view of a detail showing the male die in up position and its relation to the upper and lower drawing rings.
Figure 6:
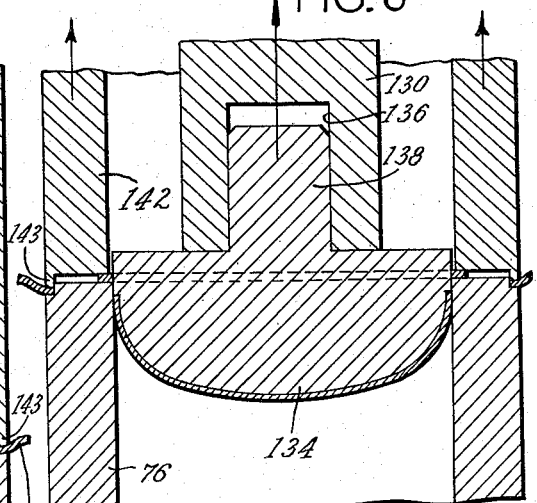
Figure 6 is a similar view showing the male die in its drawing position.

In Figures 5 and 6, there is shown diagrammatically the coaction between the upper drawing ring mechanism which includes plate 74 and rings 140, 142, the lower drawing ring 76, and the punch or male die. It will be noted that ring 142 may be provided with a cutting element 143 which is instrumental in cutting a blank such as a circular blank B in the illustrated embodiment, as the ring is moved down by plunger rods 46 into operative position relative to lower drawing ring 76. Due to the fact that levers 56 and 60 comprising the toggle are in locked position at this time, there is a constant and predetermined space formed by the lower face of ring 142 and the upper face of ring 76. In this manner as the male die moves down through the drawing ring 76 following the operation of cutter 143, the material is drawn and the edges of the blank can slide relative to rings 142 and 76 during the drawing operation. Waste material is pinched off by means of the coaction between the male die 134 and the lower drawing ring 76. The two main steps are illustrated in Figures 5 and 6. If desired, the cutter 143 may be eliminated in a case where a shallow form is to be drawn in which case the narrow die operates both as a punch and a die in separating the section to be drawn from the preheated web portion and drawing it through the lower drawing ring 76. The finished article can be removed from the lower drawing ring 76 by any suitable conventional means such as a push-out rod or a blast of compressed air directed against the article (not shown), or manually. Finished articles may also be ejected by allowing the next article formed to engage and press a previously shaped article downwardly out of the machine.

Figure 7:
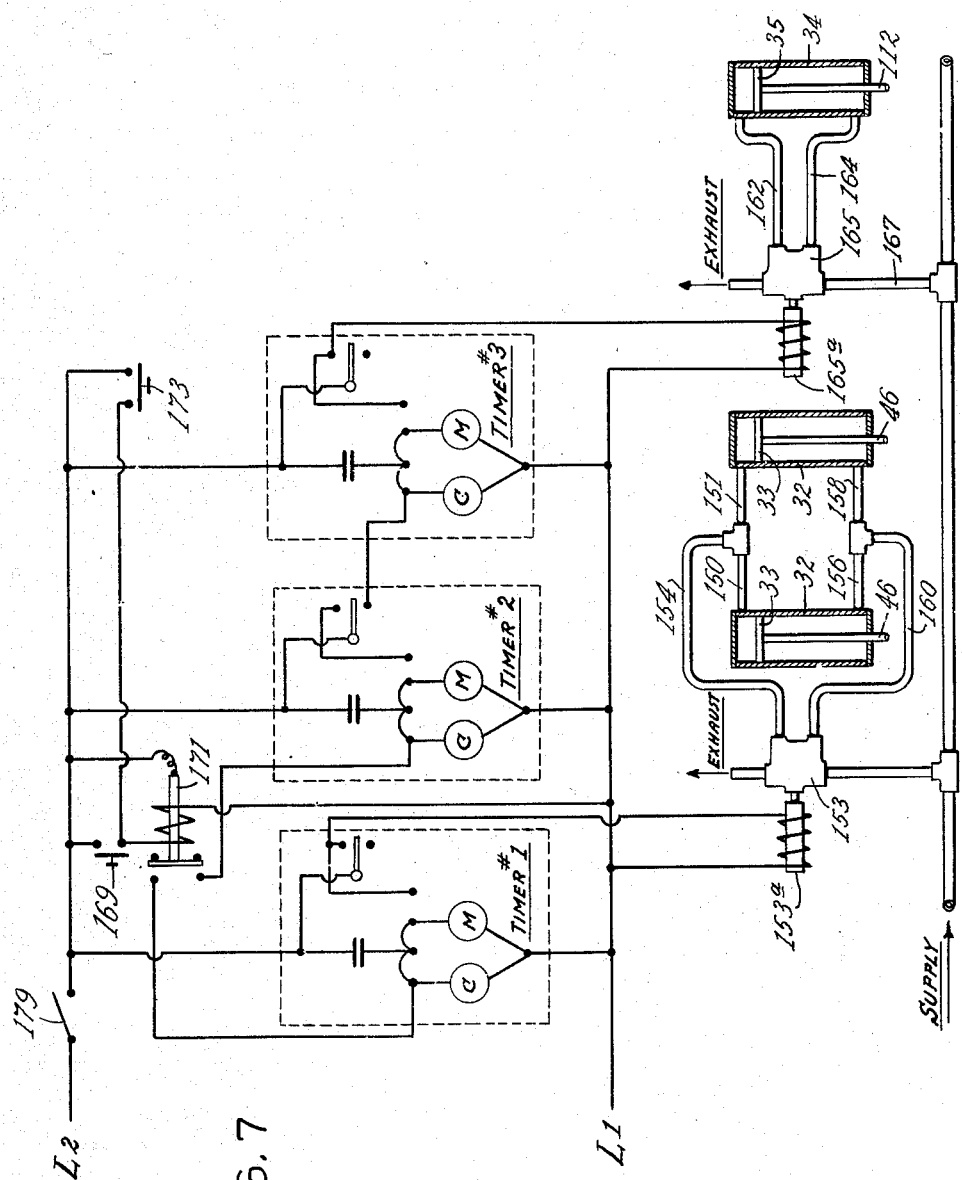
Figure 7 is a diagrammatic view showing a suitable electric and pneumatic control for operating the machine.

Figures 1, 3 and 7 illustrate the manner for operating the press. Compressed air is introduced in the upper ends of the cylinders 32 by means of conduits 150, 151 connected to a supply conduit 154 which in turn is connected through a four-way valve 153 (Figure 7) to the source of supply of compressed air. In a similar manner conduits 156, 158 are connected to the lower ends of cylinders 32. Compressed air is furnished to conduits 156, 158 by means of a conduit 160 also connected to said four-way valve 153. Upon introduction of compressed air in conduits 160, the pistons 33 in cylinders 32 are forced upwardly thereby raising rods 46, breaking the toggle, and lifting plate 74 and rings 140, 142 detachably mounted thereon.

Piston rod 112 secured to piston 35 in cylinder 34, which operates the male die 134, is also reciprocated by means of compressed air. A conduit 162 which is connected to the upper end of the cylinder is in turn connected to a four-way valve 165 which by means of a conduit 167 is connected to the source of supply. A conduit 164 connected to the lower end of cylinder 34 is responsible for raising the piston rod 112 once during each cycle. Conduit 164 is also connected to the four-way valve 165. Further disclosure of the control and operation of the press is given hereinafter.

Figures 1 to 4, inclusive, show a preferred form of web feeding and heating mechanism constituting a part of the machine. Spaced plates 170 mounted on bed plate 26 and brackets 172 extend through the machine as indicated in Figures 1 and 2. Plates 170 may be mounted in any suitable manner (not shown) for adjustment to and from each other in order that the web feeding mechanism may be adapted to feed different widths of webs. A shaft 174 mounted in plates 170 adjacent the infeed end of the web feeding mechanism is provided with a gear 176 meshing with a gear 178 on a stud shaft 180, also supported by a plate 170. Shafts 174 and 180 are provided with sprockets 182 upon which travel upper and lower chains, designated generally 184, which form an important part of the web feeding mechanism. These chains, which travel on sprockets 182 extend past the upper and lower die rings of the press to a point adjacent the discharge end of the machine (Figure 3), where they run over sprockets 186, 188 mounted on stud shafts 190, 192 supported in adjustable bearings mounted in the side plates 170. By means of set screws 194, the tightness of the chains may be controlled.

Shafts 174, 180 are driven in the direction shown by the arrows in Figure 2 in order that the gripping-feeding chains 184 may progressively engage, grip and firmly hold the longitudinal edges of the web W, progressively feed predetermined lengths thereof into a heating zone Z and thence to and past the shaping mechanism for discharge of any waste from the machine. Reel R may be mounted on an arbor 196 extending between plates 170. The web W passes from the reel R over idler rollers 198 and 200 suitably supported in side plates 170 on shafts 202, 204, respectively.

Since it is desired to firmly grip both the upper and lower faces of the longitudinal edges of the web W progressively as the web is pulled from the supply reel R, and during the entire feed thereof subsequent to initial engagement, two sets of chains and operating means are provided, each set preferably being located closely adjacent the inner face of its plate 170 (as shown in Figure 3).

In the illustrated embodiment, chains 184 are driven intermittently by means of a suitable pawl and ratchet device. Loosely mounted to shaft 174 is a pinion 209 having integrally formed thereon or secured thereto in known manner, a disk 210 on which is pivotally mounted a pawl 212 adapted to engage a ratchet 214 fixed to shaft 174. Since it may be desired to feed different lengths of material according to the demands of the various shaping jobs, any suitable web feeding-adjusting device can be employed. This may take the form of a block 215 adjustably secured to rack 216 by means of screw 221 adapted to engage the underside of bracket 172 as rack 216 travels upwardly. The position of block 215 on rack 216 therefore determines the length of web fed.

Pinion 209 meshes with a rack 216 having fixed to its lower end a piston (not shown) mounted for reciprocation in pneumatic cylinder 218. The upper end of rack 216 runs on roller 217 between spaced plates of a bracket 219. By means of conduits 220, 222 and four-way valve 224 operated by solenoid 226, in known manner, rack 216 is reciprocated to cause intermittent rotation of shafts 174 and 180 to feed predetermined lengths of web from the supply reel R, step by step to and through the heating zone Z, and on the next feeding movement into the press.

As illustrated, the operation of solenoid 226 is controlled by means of the coaction between an adjustable trigger, such as a set screw 228, mounted on plate 74. When in the continued operation of the machine, plate 74 is moved upwardly, trigger 228 engages a normally open switch 330 which closes a circuit through lines 232, 234 thereby energizing the solenoid 226 to open the valve 224 through conduit 222 which results in upward travel of rack 216 for rotation of shafts 174, 180. Upon the next down movement of the upper drawing ring 174, the circuit through lines 232, 234 and solenoid 226 is broken, and valve 224 is opened through conduit 220 and the rack 216 is lowered thereby completing the feeding cycle.

Referring to Figures 2, 3 and 4, it will be seen that chains 184 may take the form of shoes 183 having flat web edge engaging surfaces connected by alternate links 185. The spacing and arrangement of shoes 183 of upper and lower chains 184 is such that each shoe on the feeding lap of the upper conveyor opposes a like shoe on the feeding lap of the lower conveyor. The spacing of the shoes constituting the feeding laps is such that the longitudinal edges of the web being progressively engaged and fed by the chains 184 are firmly held during the entire engagement of the web edges by the shoes. This provides a firm grip for supporting the web at all times during the several operations performed thereon. The vertical distance between the feeding laps of the chains 184 can be adjusted in accordance with the web thickness to insure proper gripping and feeding. This may take the form of pressure bars 187 adjustably secured to plates 170 by means of screws 189 arranged to press against these laps.

As the web is fed intermittently from the reel R in the manner described hereinabove, it is positioned in a heating zone Z in the range of operation of a heater designated generally 230. Heater 230 may be mounted in any suitable manner upon brackets 232a suitably supported in side plates 170. It has been found that best results can be obtained in drawing various shapes of articles if certain portions of each length of web fed into the heating zone Z are subjected to what we term patterns of heating. That is, in drawing heated thermoplastic materials, danger of breakage or cracking can be substantially eliminated and more satisfactory drawing obtained, if those portions subjected to the deepest drawing or greatest stresses are subjected to a greater degree of heat than those portions which are not so manipulated during the drawing or shaping operation. In the form selected for purposes of illustration, heater 230 is provided with a plurality of heating elements, such as coils 234, 236 and 238 arranged in any desired pattern according to the requirement of a particular shape being formed. Because of an arrangement of heating elements such as described hereinabove, I have found that it is possible to obtain great efficiency in the formation of shaped figures or articles due to the fact that each length of web material fed and located in the heating zone Z, is heated until substantially the width of each heated length is made available for shaping. In fact, the heater may actually cause the web feeding shoes 183 to become hot and it is unnecessary to provide against this contingency.

As shown in Figure 4, resistance coils 234, 236 and 238 are shown arranged substantially concentric. The temperature of each coil may be controlled by means of rheostats 233, 235 and 237 and the degree of heat intensity varied accordingly.

Due to the fact that the longitudinal edges of the web are firmly gripped from the time the web comes under the influence of the gripping shoes 183 of upper and lower chains 184 and as the web is progressed stepwise and fed in predetermined lengths from the reel R to and through heated zone Z and to the drawing mechanism constituted of upper drawing plate 74, lower drawing ring 76 and die 134 where a pattern or differentially heated blank is removed from the heated length and drawn to shape and the waste is discharged from the machine, the web is firmly supported and any tendency to sag which might result in the heated web portion being burned or injured is substantially eliminated. Also because of the manner in which the web is supported and fed to and through the press, any danger of the heated portion of the web being displaced, stretched, broken or otherwise damaged is overcome.

The air cylinders 32 and 34 are of the well known double acting type and the four-way valves 153 and 165 which control the action of the piston in the corresponding cylinders 32 and 34, respectively, are of the four-way solenoid controlled type, such as manufactured by the Automatic Switch Company, New York. Each valve, of course, is equipped with an exhaust pipe and carries a solenoid 153a and 165a, respectively.

These solenoids are controlled and operated through an arrangement of automatic timers which assure perfect control of the sequence of operation as well as the timing of the relative movements of the die 134 and the upper drawing plate 74. It is of course understood that when changing the shape and types of die, the timers may be readjusted to suit the new conditions.

The timers shown in Figure 7 may be the series 2800 timers manufactured by the Automatic Temperature Control Company Incorporated, of Philadelphia, Pennsylvania. The illustration in Figure 7 discloses an arrangement of three timers which suit the embodiment of the invention. Timer No. 1, No. 2 and No. 3 are synchronized and connected to a common source of power indicated by lines $L_1$ and $L_2$. Timer No. 1 is employed for the purpose of controlling the solenoid 153a actuating which in turn controls the movement of pistons 33 in cylinders 32 which represent the operating means for the upper drawing plate 74. Timers No. 2 and No. 3 control the solenoid 165a actuating the valve 165 which controls the movement of piston 35 in cylinder 34 representing the operating means for the die 134. The machine is equipped with a manual starting button 169 which when pressed energizes a relay 171 which in turn starts the timers No. 1 and No. 2. The solenoid 153a is energized for the time set on timer No. 1. At the end of time set on timer No. 2, timer No. 3 starts and energizes solenoid 165a for the time set on timer No. 3. The arrangement in the disclosure is such that the time set on timer No. 1 must be greater than the combined time set on timers No. 2 and No. 3, meaning that the upper drawing plate 74 moves downwardly when solenoid 153 is energized by the action of timer No. 1 and remains in down position for the time set on said timer. The die 134 descends when solenoid 165a is energized by timer No. 3 and ascends at the end of the time set on said timer. The timers, of course, are so set that the drawing plate 74 remains in contact with the material until the die has completed its operation and starts to ascend again.

In order to avoid the manual operation of pressing the starter button 169 at the end of each cycle of operations, another normally open switch 173 is provided which is automatically tripped by means of a lug 177 on block 215 fixed to gear rack 216 as the rack reaches its upper position at the end of each feeding stroke of said rack 216. A main switch 179 is provided to start or stop the entire machine.

The invention above described may be varied in construction within the scope of the claims, for the particular device, selected to illustrate the invention, is but one of many possible concrete embodiments of the same. It is not, therefore, to be restricted to the precise details of the structure shown and described.

What is claimed is:

1. A press having a source of supply of thermoplastic web, an upper drawing ring and a lower drawing ring and means associated therewith for forming shaped articles from predetermined lengths of said web of sheet material, web feeding mechanism extending along the path of travel of said web from a point adjacent said source of supply and through said press to a web discharge station beyond said dies, a heater provided with a plurality of prearranged heater elements, means for controlling the intensity of heat in said elements for heating selected portions of each length to different temperatures to condition each length differentially for shaping, means mounting said heater adjacent the path of travel of said web, means for moving said upper drawing ring to and from said lower drawing ring including means for locating said upper drawing ring at a constant predetermined position spaced from said lower drawing ring in which a conditioned length is located between said rings for substantially free movement of said length between said rings and means for driving said feeding mechanism to progressively engage and grip the opposite longitudinal edges of said web and move therewith from said point and to said web discharge station.

2. A press having an upper drawing ring and a lower drawing ring and means associated therewith for forming shaped articles from predetermined lengths fed from a continuous web of sheet material, web feeding mechanism including edge gripping conveyors extending along the path of movement of said web through and out of said press, a heater provided with a plurality of prearranged heater elements for heating selected portions of each length to different temperatures to condition each length differentially for shaping, means mounting said heater in the path of travel of said web to said press, means for moving said upper drawing ring to and from said lower drawing ring including means for locating said upper drawing ring at a constant predetermined position spaced from said lower drawing ring when a conditioned length is located between said rings for substantially free movement of said length between said rings, and control means including means mounted on said upper drawing ring and means coacting therewith for controlling said web feeding mechanism to effect the feed of an additional length of web upon upward movement of said upper drawing ring to its inactive position.

3. In a machine of the class described having an upper drawing ring, a lower drawing ring, and a male die, toggle mechanism for moving said upper drawing ring to and from said lower drawing ring, means for limiting the movement of said upper ring towards said lower ring, mechanism extending along opposite sides of the path of movement of said web and moving therewith through and out of said press for feeding predetermined lengths of thermoplastic or like sheet material into the range of operation of said rings and die, a heater, means mounting said heater in the path of travel of said web to said rings and die, means for creating different intensities of heat in said heater according to a predetermined drawing pattern, said last named means being constructed and arranged to heat selected portions of each length of web subjected to the influence of said heater differentially to render said selected portions more plastic than other portions of the same heated length, and means for intermittently driving said feeding mechanism to advance each heated web length to said rings and die, and locate an adjoining web section for heat treatment.

4. A machine of the class described having a source of supply of thermoplastic web material, an upper drawing ring, a lower drawing ring, and a male die, means for limiting movement of said upper ring towards said lower ring, a heater, mechanism for feeding predetermined lengths of thermoplastic or like sheet material into the range of operation of said rings and die, including spaced endless supporting members provided with opposed closely spaced grippers adapted to move progressively into gripping engagement with opposite faces of the longitudinal edges of said web for positively gripping and holding said edges during the movement of said web from said source of supply to and beyond said rings and die, means mounting said heater in the path of travel of said web to said rings and die, means for creating different intensities of heat in said heater according to a predetermined drawing pattern, said last-named means being constructed and arranged to heat selected portions of each length of web subjected to the influence of said heater differentially, and means for intermittently driving said feeding mechanism to advance each heated web length to said rings and die, locate an adjoining web section for heat treatment, and release the edges of said web beyond said rings and die.

5. A machine of the class described having shaping mechanism including an upper drawing ring, a lower drawing ring, and a male die, means for limiting movement of said upper ring towards said lower ring, mechanism for feeding predetermined lengths of thermoplastic or like sheet material into the range of operation of said rings and die, including endless supporting members provided with opposed closely spaced grippers, a heater, means mounting said heater in the path of travel of said web to said rings and die, means for creating different intensities of heat in said heater according to a predetermined drawing pattern, said last-named means being constructed and arranged to heat selected portions of each length of web subjected to the influence of said heater differentially, power means to operate said mechanism for feeding and means on said upper drawing ring for initiating the operating of said power means to obtain an intermittent drive of said feeding mechanism to advance each heated web length to said rings and die, and locate an adjoining web section in the range of action of said heater for heat treatment, means for moving said upper ring and die toward said lower ring to form a shaped object from said heated length of web, and means mounting said grippers for releasing the edges of said web at a discharge station outside of said shaping mechanism.

6. A press having shaping mechanism which has a movable element and a die assembly for forming shaped articles from predetermined lengths fed from a source of supply of sheet material, material-feeding mechanism comprising spaced endless supporting elements extending along the path of movement of said material through said press from a point proximate said source of supply to a discharge station beyond said shaping mechanism, opposed material-gripping members carried by said elements and constructed and arranged to grip the opposite longitudinal edges of the material being fed to said shaping mechanism from the source of supply, said gripping members being effective to grip positively said edges of the material at all times during the feeding of the material by the feeding mechanism until said gripping members approach said discharge station, heater means to produce a predetermined heat pattern upon selected portions of each length of the material with various of said portions being at different temperatures whereby each length is conditioned differentially for shaping, means mounting said heater means along the path of travel of the material between the source of supply and said shaping mechanism, means mounted on said movable element of the shaping mechanism for initiating the operation of said feeding mechanism for advancing a conditioned length of the material to said shaping mechanism, and means to move said movable element of the shaping mechanism.

7. In a machine of the class described having die means to form thermoplastic sheet material into shaped articles, the combination of, material-feeding mechanism comprising two endless belt assemblies positioned along the opposite sides of the path of the sheet material, each of said assemblies including metal clamping elements which clamp rigidly successive edge portions of the sheet material, stationary rail means to maintain continuous the clamping relationship of said clamping elements while moving the sheet material along said path, power means to impart movement to said clamping elements whereby the sheet material is moved along said path solely by action through said clamping elements, heating means located adjacent the path of sheet material to soften selected portions of the sheet material as it is advanced to said die means, and means operated by completion of each shaping operation to initiate the operation of said power means thereby to feed a heated portion of sheet material to the die means.

8. A machine as described in claim 7 which includes, means responsive to the completion of each feeding operation to operate said die means.

9. The method of fabricating thermoplastic sheet material to form objects of complex shape in a step-by-step operation whereby predetermined areas of successive sections of the sheet material are heated and fabricated, comprising the steps of, feeding successive sections of the sheet material to the fabricating zone by rigidly gripping the side edges of each of the sections as it is withdrawn from a source of supply and maintaining said gripping action while the sections are advanced to the fabricating zone, subjecting the predetermined area of each section to a differential heating effect prior to the arrival of the section at the fabricating station whereby the area is heated in accordance with a predetermined pattern, clamping a peripheral zone of each predetermined area with a predetermined clamping pressure to maintain an unvarying thickness in said zone, cutting said predetermined area free from its section substantially simultaneously with said clamping, and forming the heated pattern into the object or objects while maintaining said predetermined clamping pressure around said periphery.

10. Apparatus as described in claim 6 wherein said shaping mechanism includes a pair of clamping rings one of which is stationary and the other of which is movable, said clamping rings having at their outer peripheries cooperating cutting edges which interengage and cut free the material to be formed during each forming operation, and toggle means to move said movable element.

11. In a press for forming articles from thermoplastic sheet material of the type having a source of supply of sheet material and a forming station where the articles are formed and also having a discharge station, the combination of, a die assembly including a forming element at said forming station for forming said articles from predetermined areas of the sheet material, feeding mechanism extending along the opposite edges of the path of the sheet material from said source of supply past said forming station and to said discharge station, said feeding mechanism including a plurality of clamping members presenting rigid clamping surfaces and means to move said clamping members along paths whereby the respective rigid clamping surfaces are moved toward each other so as to engage and clamp progressively the opposite surfaces of each of the opposite exposed longitudinal edges of successive portions of the sheet material as the sheet material is withdrawn from said source of supply, and said feeding mechanism including means to hold said clamping members in fixed clamping relationship thereby to maintain an unvarying clamping pressure between each two cooperating portions of said clamping surfaces during the entire movement of each portion of sheet material along said path to said discharge station, driving means for driving said feeding mechanism to impart progressive feeding movement to the sheet material solely through said clamping members, heater means for heating each of said predetermined areas of the sheet material from which the articles are to be formed, heat-control mechanism for controlling intensity of the heat of said heater means thereby to produce a heat pattern within each of said predetermined areas to condition the areas for forming, means mounting said heater means adjacent the path of travel of the sheet material, said die assembly including a pair of mating rings which are adapted to move to and from clamping relationship around the periphery of each of the predetermined areas, and operating means to move one of said rings into predetermined spaced relationship with respect to the other.

12. In a press for forming articles from thermoplastic sheet material of the type having a source of supply of sheet material and a forming station where the articles are formed and also having a discharge station, the combination of, a die assembly including a forming element at said forming station for forming said articles from predetermined areas of the sheet material, feeding mechanism extending along the opposite edges of the path of the sheet material from said source of supply past said forming station and to said discharge station, said feeding mechanism including a plurality of clamping members presenting rigid clamping surfaces and means to move said clamping members along paths whereby the respective rigid clamping surfaces are moved toward each other so as to engage and clamp progressively the opposite surfaces of each of the opposite exposed longitudinal edges of successive portions of the sheet material as the sheet material is withdrawn from said source of supply, and said feeding mechanism including means to hold said clamping members in fixed clamping relationship thereby to maintain an unvarying clamping pressure between each two cooperating portions of said clamping surfaces during the entire movement of each portion of sheet material along said path to said discharge station, driving means for driving said feeding mechanism to impart progressive feeding movement to the sheet material solely through said clamping members, heater means for heating each of said predetermined areas of the sheet material from which the articles are to be formed, heat-control mechanism for controlling intensity of the heat of said heater means thereby to produce a heat pattern within each of said predetermined areas to condition the areas for forming, means mounting said heater means adjacent the path of travel of the sheet material, said means to hold the clamping members comprising a stationary structure presenting a surface or surfaces to exert continuous uniform pressure upon each of said clamping members while they are moving along the path of the sheet material.

13. In a machine of the class described for forming thermoplastic sheet material, the combination of, material-feeding mechanism including a plurality of parallel endless assemblies carrying individual clamping members which present rigid clamping surfaces which are moved along paths whereby a clamping surface from one assembly cooperates with a clamping surface of another assembly to engage and clamp the opposite surfaces of a portion of the exposed longitudinal edge of the sheet material and to move therewith along said path, said feeding mechanism including clamp-holding rail structure to engage said clamping elements and to hold them in said clamping engagement with the sheet material throughout the movement along a path, heater means positioned along said path and adapted to heat predetermined portions of the sheet material thereby to condition the sheet material for forming, a die assembly including a forming element at a forming station along said path and so positioned with respect to said heater means and with respect to the movement of the sheet material that said predetermined portions of the sheet material are positioned at said forming element while heated, said die assembly being operative to impart to the heated portions of the sheet material a predetermined form, means to move the sheet material along said path past said heater means and said forming station solely by the engagement by said clamping members, and control means to control the feeding operations.

14. Apparatus as described in claim 13 wherein said heater means comprises a plurality of heating elements, and means to maintain said heating elements individually at selected temperatures.

15. A machine to make hoods from sheet plastic material comprising in combination, a horizontally arranged draw plate having an opening with an edge corresponding to a base line of a hood, a roll support adapted to hold a roll of plastic sheet material, a web support for the material, power driven means adapted to intermittently draw portions of material off its roll and put it on the web support, an open ended heating means in position for the web to pass through toward said draw plate, web feeding means including power driving means to feed the forward end of the web intermittently to draw one part into the oven and another heated part from the oven across the draw plate to cover its opening, web cutting means to cut a blank of predetermined length from the heated part of the web, clamping means to uniformly press the margin of the heated cut part around the draw plate opening so as to permit controlled slipping, power tool reciprocating means mounted above the draw plate opening, a drawing tool, in the shape of a core corresponding to a hood cavity, such tool carried by said reciprocating means, the aforesaid elements being operable under power for repeated cycles of operation, to draw a heated sheet portion from the oven, cut a blank of predetermined length from said heated portion clamp it over the draw plate opening, move the drawing tool against the plastic material and draw the latter to hood form while the material at the edges of the opening are held flat by the clamping means.

16. A machine to make articles from sheet plastic material comprising in combination, a horizontally arranged draw plate having an opening with an edge corresponding to a base line of an article, a material support adapted to hold a web of plastic sheet material, a web support for the material, power driven means adapted to intermittently move portions of material from said material support to said web support, heating means in position for the web to pass when moving from said material support to said draw plate, web feeding means including power driving means to feed the forward end of the web intermittently to draw a portion thereof to a position wherein it is heated by said heating means and to draw another portion which is heated from said heating means across the opening in said draw plate whereby said opening is covered, web cutting means to cut a blank of predetermined size from the heated portion of the web which blank includes a portion covering said opening, clamping means to press uniformly the margin of the heated cut blank around the draw plate opening so as to permit controlled slipping, power tool reciprocating means mounted above the draw plate opening, a drawing tool having a shape corresponding to that of the articles being formed, said tool being carried by said reciprocating means, the aforesaid elements being operable under power for repeated cycles of operation to draw a heated portion of the material from said heating means, to then cut a blank of predetermined size from said heated portion, to clamp the blank over the draw plate opening and to move the drawing tool against the material and draw the material into the article form while the material at the edges of the opening is held flat by the clamping means.

17. A machine for making articles from sheet plastic material comprising in combination, a die assembly for forming shaped articles from predetermined lengths of sheet material, a material support adapted to hold a web of plastic sheet material, a web support for the material, power driven means adapted to move portions of material from said material support to said web support, heating means in position for the web to pass when moving from said material support to said die assembly, web feeding means including power driven means to feed the forward end of the web intermittently to draw a portion thereof to a position wherein it is heated by said heating means and to draw another portion which is heated from said heating means into position to be formed into articles by said die assembly, web cutting means to cut a blank of predetermined size from the heated portion of the web which blank includes a portion positioned at said die assembly, clamping means to press uniformly the margin of the heated cut blank around the periphery of the die assembly so as to permit controlled slipping, power means adapted to operate said die assembly, said die assembly including a die means having a shape corresponding to that of the articles being formed, the aforesaid elements being operable under power for repeated cycles of operation to draw a heated portion of material from said heating means, to cut a blank of predetermined size from said heated portion, to clamp the blank at said die assembly and to draw the central portion of the blank into the article form while the material at the periphery of the blank is held flat by the clamping means.

EARL F. MIDDLETON.

REFERENCES CITED

The following references are of record in the file of this patent:

UNITED STATES PATENTS

| Number | Name | Date |
|---|---|---|
| 1,181,964 | Bohlman | May 2, 1916 |
| 1,391,805 | Subers | Sept. 27, 1921 |
| 1,406,919 | Boecler | Feb. 14, 1922 |
| 1,628,257 | Mallory | May 10, 1927 |
| 1,904,268 | Bronson | Apr. 18, 1933 |
| 1,968,442 | Clark et al. | July 31, 1934 |
| 2,009,748 | Sherwood | July 30, 1935 |
| 2,046,047 | Watkins | June 30, 1936 |
| 2,120,328 | Ferngren | June 14, 1938 |
| 2,210,509 | Strauch | Aug. 6, 1940 |
| 2,229,613 | Strauch | Jan. 21, 1941 |
| 2,319,099 | Abramson et al. | May 11, 1943 |
| 2,377,946 | Leary | June 12, 1945 |